W. R. SMITH.
SEAT CUSHION RETAINER.
APPLICATION FILED JULY 2, 1913.
1,074,986.
Patented Oct. 7, 1913.
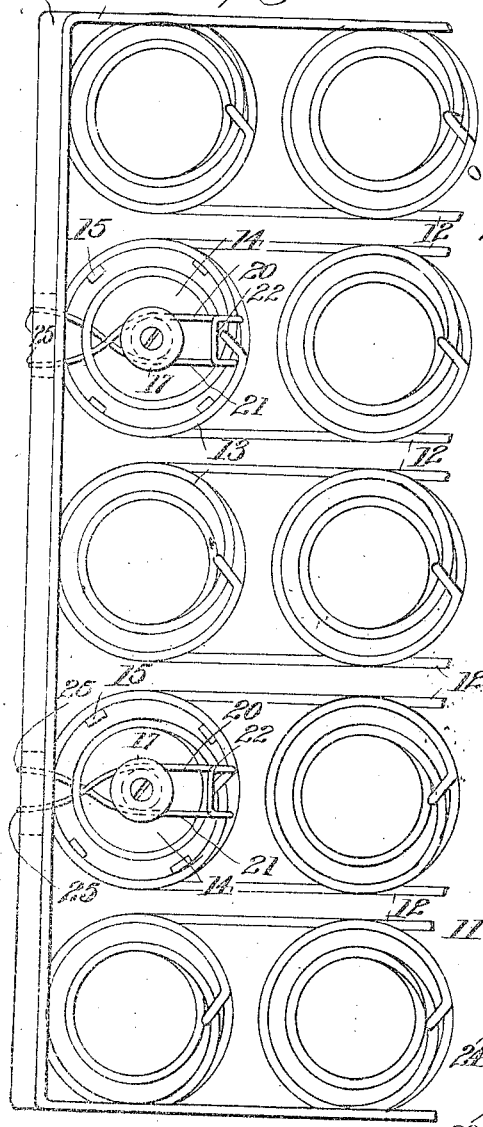
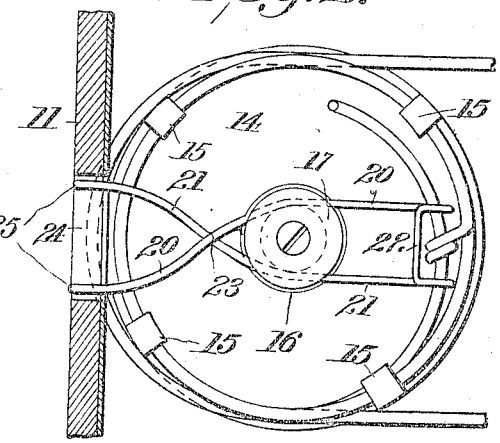
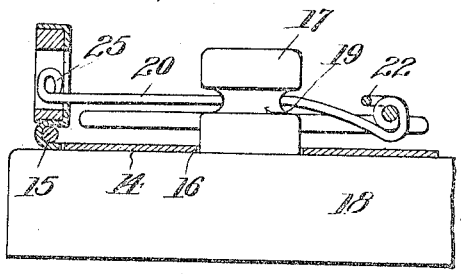
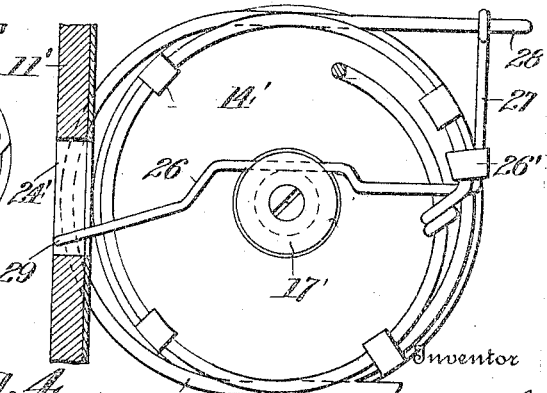
Witnesses
Inventor
Watson R. Smith
By
Attorney

UNITED STATES PATENT OFFICE.

WATSON R. SMITH, OF JACKSON, MICHIGAN.

SEAT-CUSHION RETAINER.

1,074,986.                Specification of Letters Patent.         Patented Oct. 7, 1913.

Application filed July 2, 1913. Serial No. 777,088.

*To all whom it may concern:*

Be it known that I, WATSON R. SMITH, a citizen of the United States, residing at Jackson, in the county of Jackson and State of Michigan, have invented certain new and useful Improvements in Seat-Cushion Retainers, of which the following is a specification.

This invention relates to seat cushion retainers.

The cushions in vehicles, particularly in automobiles, carriages and the like, are constantly sliding forwardly off of their support and to prevent this, in some instances, a molding or metal strip is nailed or otherwise secured across the front of the support upon which the cushion rests, rising up a little above the base of the cushion so as to hold the same from sliding forwardly off of its support.

One object of the present invention is to provide means between the cushion and the support upon which it rests whereby the cushion may be detachably secured to the support and held against sliding movement forwardly off of the support without the employment of the present type of molding or metal strips secured to the support across the front of the cushion.

Another object resides in the provision of a seat cushion retainer for automobile or other vehicles embodying among other characteristics means whereby the cushion is effectively secured to its support without danger of forward sliding movement and yet readily removed from its support when desired.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings:—Figure 1 is a top plan view of the front portion of a spring cushion illustrating my invention; Fig. 2 is a fragmentary horizontal sectional view illustrating one of the retainers in operative position; Fig. 3 is a fragmentary view illustrating the invention in side elevation; and Fig. 4 illustrates a modified form of cushion retainer.

Referring now to the accompanying drawings, and more particularly to Figs. 1 to 3, inclusive, there is shown a spring structure or cushion embodying upper and lower frames 10 and 11, respectively, between which frames, and secured in any suitable manner on suitable supporting elements 12 are springs 13. The upper frame may be dispensed with, if desired, and the parts hereinbefore described may be connected together in any suitable manner.

Secured to the lower convolutions of two of the front springs are plates 14. Each of these plates is provided at its marginal edge with fingers 15 by which the plates may be secured to the lower convolution of the corresponding springs. These plates 14 have central apertures 16 which are adapted to receive the buttons 17 secured in any suitable manner to the support 18 on which the cushion rests. In some instances one button 17 and one socket plate 14 is sufficient to prevent sliding movement of the cushion. Especially is this true in an automobile, carriage or other vehicle where two small cushions are arranged side by side in front of the vehicle. Where the seat is long, that is, of a length substantially equal to the width of the body of the vehicle, it is preferred that two buttons 17 and socket plates 14 be employed and these two retainers thus formed may be located at the front corners of the cushion or as shown in Fig. 1, or in any other appropriate manner.

While the passage of one or more buttons 17 through one or more apertures 16 of one or more plates 14 will prevent forward sliding displacement of the cushion, it is preferable that the retainers embody means to prevent any undue forward or other play of the cushions. To this end each button 17 is preferably provided with an annular groove forming a neck 19, as shown particularly in Fig. 3. Spring arms 20 and 21 are adapted to engage the necks 19 of the buttons 17 on opposite sides of the button, as shown particularly in Figs. 1 and 2. These arms 20 and 21 may be formed of a single piece of wire or other resilient material and bent intermediate their ends to form a bight or hook 22 so that the arms may be connected to the lower convolutions of the corresponding springs. In front of the buttons 17 the arms 20 and 21 preferably cross each other as indicated at 23 with their free ends extending toward opposite sides of the opening 24 formed in the base frame 11 so that by pinching or forcing the free extremities 25 of the arms 20 and 21 toward each other, the arms may be moved out of coöperative relation with the necks 19 of the buttons 17 so as to permit ready disconnection of the cushion from its support 18 and so as to permit ready securing of the cushion to the support 18 by the button and socket connection form of retainer herein described. In upholstering the spring structure or other cushion, the facing (not shown) may be provided with an opening adjacent the opening 24 in the base frame 11 so as to permit access to the free extremities 25 of the arms 20 and 21 and thereby facilitate connection and disconnection of the arms with the buttons 17.

In Fig. 4 there is shown a modified form of the invention. The base frame 11' has an opening 24' and one or more springs 13' may have secured thereto a socket plate 14' having an aperture the same as the aperture 16 in the aforesaid plates 14 to receive buttons 17' which are of the same formation as the aforesaid buttons 17. About the only material difference between this modified form of button and the button illustrated in Figs. 1 to 3, inclusive, resides in the fact that but a single arm 26 is employed. This arm engages the neck of the button 17' on one side thereof and, like the arms 20 and 21 of the other form of the invention, when engaged with the neck of the buttons prevents accidental disconnection of the cushion from the button. The inner end of this arm 26 is preferably provided with an extension 27 which is connected in any suitable manner to the spring supporting wire 28, and also by means of a clip 26' to the lower convolution of the corresponding spring. The free end 29 of the arm 26 is operable in the opening 24' of the base frame 11' so that the arm may be readily moved into and out of the neck of the button 17' by moving the free end of the arm to opposite sides of the opening 24'.

From the foregoing it will be seen that I provide simple, inexpensive, and durable forms of cushion retainers, designed particularly for use, although I do not restrict myself thereto, in connection with spring structures for automobile and other vehicles.

What is claimed is:—

1. The combination of a cushion and the support upon which the cushion rests, a cushion provided with an opening at its front, a plate carried by the cushion provided with an aperture, means carried by the support for projection through the apertured plate, and means engageable with the means which projects through the apertured plate to fasten the latter means against accidental withdrawal, through the aperture of said plate, said fastening means being accessible through said opening at the front of the cushion to manually operate the same.

2. The combination of a cushion and the support upon which the cushion rests, a cushion provided with spaced openings at its front, spaced plates carried by the cushion each provided with an aperture, buttons carried by the support for projection through the apertured plates, each button having a neck portion, and a spring arm engageable with the neck portion of each button with each arm having one end arranged adjacent one of the openings in the front of the cushion whereby the arms are accessible through the openings at the front of the cushion to move the same into and out of engagement with the neck portions of the corresponding buttons so as to fasten and unfasten the cushions to the buttons.

3. The combination of a spring structure and a support on which the structure rests, said structure including a base frame provided with an opening, springs mounted on the base frame, a plate secured to the lower convolution of one of the springs and provided with a central opening, a button secured to said support and which is received by the opening in said plate, the button having a neck portion, a spring arm having connection with the spring to which said plate is secured and adapted to engage the neck of said button, the outer extremity of the spring arm lying in the opening of the base frame so that it may be moved into and out of coöperative relation with the neck of said button.

4. The combination with a spring structure and a support on which the spring structure rests, the spring structure including a base frame provided with spaced openings in its forward side, springs mounted on the base frame, plates secured to the springs arranged opposite the openings in the base frame, the plates each having fingers adapted to embrace the lower convolutions of such springs so as to secure the plates thereto, each plate having a central opening, buttons secured to said support and received by the openings in said plates, said buttons each having a neck, and a spring arm having connection with each of the springs to which said plates are secured and which engage the necks of said buttons, the free extremities of said spring arms lying in said openings of the base frame.

5. The combination of a cushion and the support upon which the cushion rests, the cushion including a base frame provided with an opening, an apertured plate carried by the cushion, means secured to the support adapted to extend through the aperture of said plate, and an arm arranged to operatively connect with said button to fasten and retain the cushion on the support against sliding movement off of the support, and having a part arranged adjacent the opening in the base frame whereby the arm may be operated through the opening in the base frame to move it into and out of operative connection with said button.

6. The combination of a spring structure and the support on which the structure rests, said structure including a base frame provided with an opening, springs mounted on the base frame, a plate secured to the lower convolution of one of the springs and provided with a central aperture, means secured to said support which is received by the aperture of said plate, a pair of spring arms mounted over said plate to engage said means which projects through the aperture of the plate, the arms crossing each other between the projecting means and the opening in the base frame with the forward extremities of the arms arranged adjacent the opening in the base frame so that they may be accessible through the opening to be moved into and out of an operative relation with said projecting means.

7. The combination of a cushion provided with an opening, an apertured member secured to the cushion to receive a projection through its aperture, and fastening means arranged adjacent the aperture of said apertured member engageable with the projection passed through the aperture of said plate to retain the cushion in relatively fixed position, said fastening means being accessible through the opening in the cushion.

In testimony whereof I affix my signature in presence of two witnesses.

WATSON R. SMITH.

Witnesses:
 RALPH L. WILCOX,
 ETHEL M. PHELAN.